(12) United States Patent
Lee et al.

(10) Patent No.: US 7,513,124 B2
(45) Date of Patent: Apr. 7, 2009

(54) UNITARY AIR CONDITIONER

(75) Inventors: Won Hee Lee, Seoul (KR); Seung Youp Hyun, Seoul (KR); Jeong Taek Park, Ansan-si (KR); Yoon Jei Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 440 days.

(21) Appl. No.: 11/319,472

(22) Filed: Dec. 29, 2005

(65) Prior Publication Data

US 2006/0156746 A1 Jul. 20, 2006

(30) Foreign Application Priority Data

Dec. 30, 2004 (KR) .................. 10-2004-0116239

(51) Int. Cl.
*F25D 17/00* (2006.01)
*F25B 19/00* (2006.01)
*G05D 23/32* (2006.01)

(52) U.S. Cl. .................. 62/178; 62/231; 62/157

(58) Field of Classification Search .................. 62/178, 62/231, 157, 115, 228.1, 228.4
See application file for complete search history.

(56) References Cited

U.S. PATENT DOCUMENTS

| | | | | |
|---|---|---|---|---|
| 5,070,932 A | * | 12/1991 | Vlasak | 165/240 |
| 5,138,844 A | * | 8/1992 | Clanin et al. | 62/89 |
| 5,806,760 A | * | 9/1998 | Maiello | 236/11 |
| 6,370,894 B1 | * | 4/2002 | Thompson et al. | 62/158 |
| 6,450,409 B1 | * | 9/2002 | Rowlette et al. | 236/1 E |
| 6,866,202 B2 | * | 3/2005 | Sigafus et al. | 236/11 |
| 2003/0057289 A1 | * | 3/2003 | Smole | 236/49.3 |
| 2005/0016191 A1 | * | 1/2005 | Butler et al. | 62/158 |
| 2005/0281672 A1 | * | 12/2005 | Parker et al. | 416/95 |

OTHER PUBLICATIONS

U.S. Appl. No. 11/316,985 to Lee et al., which was filed on Dec. 27, 2005.
U.S. Appl. No. 11/317,015 to Lee et al., which was filed on Dec. 27, 2005.

* cited by examiner

*Primary Examiner*—Chen-Wen Jiang
(74) *Attorney, Agent, or Firm*—Greenblum & Bernstein, P.L.C.

(57) ABSTRACT

A unitary air conditioner comprises a 1-stage thermostat for generating an operation signal for the unitary air conditioner or a stop signal for the unitary air conditioner, a 1-stage indoor unit having an indoor fan, which is rotated according the operation signal from the 1-stage thermostat, a variable-capacity outdoor unit configured to be operated according to the 1-stage thermostat, the variable-capacity outdoor unit having a compressor and an outdoor fan, the operation stage of which is changed according to the operation state of the variable-capacity outdoor unit, and an indoor fan control device for controlling the indoor fan according to the operation stage of the variable-capacity outdoor unit to change the operation state of the indoor fan. The 1-stage indoor unit is operated along with another unit having different stages, and variable control is accomplished, although the 1-stage indoor unit is used, so long as the indoor fan control device is added to the unitary air conditioner. Consequently, a more efficient air conditioning system is accomplished.

18 Claims, 3 Drawing Sheets

UNITARY AIR CONDITIONER

BACKGROUND OF THE INVENTION

1. Field of the Invention

The present invention relates to a unitary air conditioner widely used in North America, and, more particularly, to a unitary air conditioner comprising a 1-stage indoor unit, to which a 2-stage thermostat or a variable-capacity outdoor unit is connected.

2. Description of the Related Art

FIG. 1 is a control circuit block diagram of a conventional 1-stage unitary air conditioner showing connection of principal circuit terminals.

As shown in FIG. 1, the 1-stage unitary air conditioner is constructed such that the 1-stage unitary air conditioner receives an operation signal Y or a stop signal from a 1-stage thermostat 11, which is mounted in a room, for operating a 1-stage indoor unit 13 and a 1-stage outdoor unit 15.

The 1-stage unitary air conditioner with the above-stated construction is an air-conditioning system widely used as one of household appliances in North America, such as the United States of America. According to an ON/OFF operation signal from the 1-stage thermostat 11, the 1-stage indoor unit 13 and the 1-stage outdoor unit 15 are turned ON/OFF while the capacities of the 1-stage indoor unit 13 and the 1-stage outdoor unit 15 are not changed. In the 1-stage indoor unit 13 is mounted an indoor fan 17. In the 1-stage outdoor unit 15 are mounted a compressor (not shown) and an outdoor fan (not shown).

FIG. 2 is a control circuit block diagram of a conventional 2-stage unitary air conditioner showing connection of principal circuit terminals.

As shown in FIG. 2, the 2-stage unitary air conditioner comprises a 2-stage thermostat 21. The 2-stage unitary air conditioner is constructed such that a 1-stage indoor unit 23 and a 1-stage outdoor unit 25 are operated in a high or low operation stage, while the capacities of the 2-stage indoor unit 23 and the 2-stage outdoor unit 25 are changed, according to a high operation signal Y2 or a low operation signal Y1 from the 2-stage thermostat 21. In the 2-stage indoor unit 23 is mounted an indoor fan 27, which is rotated such that flow rate of air can be adjusted to high, middle, and low flow rates.

In the above-described conventional unitary air conditioners, however, the indoor and outdoor units are connected to each other only if the indoor and outdoor units have the same stage(s). Consequently, the indoor and outdoor units are not connected to each other if the indoor and outdoor units have different stages.

For the 1-stage unitary air conditioner, for example, the 1-stage indoor unit 13 and the 1-stage outdoor unit 15 are connected to the 1-stage thermostat 11. For the 2-stage unitary air conditioner, on the other hand, the 2-stage indoor unit 23 and the 2-stage outdoor unit 25 are connected to the 2-stage thermostat 21. As a result, wide adaptability of the conventional unitary air conditioners is limited.

SUMMARY OF THE INVENTION

Therefore, the present invention has been made in view of the above problems, and it is an object of the present invention to provide a unitary air conditioner comprising a 1-stage indoor unit, to which a 2-stage thermostat or a variable-capacity outdoor unit is connected, whereby wide adaptability of the unitary air conditioner is accomplished without limits.

It is another object of the present invention to provide a unitary air conditioner comprising a 1-stage indoor unit, in which an indoor fan control device is mounted, the indoor fan control device being connected to a variable-capacity outdoor unit, whereby the unitary air conditioner is operated in plural stages without replacing the 1-stage indoor unit.

In accordance with one aspect of the present invention, the above and other objects can be accomplished by the provision of a unitary air conditioner comprising: a 1-stage thermostat for generating an operation signal for the unitary air conditioner or a stop signal for the unitary air conditioner; a 1-stage indoor unit having an indoor fan, the indoor fan being rotated according the operation signal from the 1-stage thermostat; a variable-capacity outdoor unit configured to be operated according to the 1-stage thermostat, the variable-capacity outdoor unit having a compressor and an outdoor fan, the operation stage of the compressor and the outdoor fan being changed according to the operation state of the variable-capacity outdoor unit; and an indoor fan control device for controlling the indoor fan according to the operation stage of the variable-capacity outdoor unit to change the operation state of the indoor fan.

Preferably, the indoor fan is configured to be rotated at least in a high or low operation stage by an indoor fan motor.

Preferably, the 1-stage indoor unit has an indoor unit control device for receiving a signal from the 1-stage thermostat, outputting a control signal to an indoor fan motor, by which the indoor fan is rotated, and transmitting a signal to the variable-capacity outdoor unit.

Preferably, the compressor mounted in the variable-capacity outdoor unit is an inverter type compressor or comprises a plurality of constant-speed compressors.

Preferably, the variable-capacity outdoor unit includes an outdoor unit control device for variably controlling the operation stage of the compressor and the outdoor fan according to the operation state of the variable-capacity outdoor unit.

Preferably, the outdoor unit control device comprises: a signal input part for receiving the signal from the 1-stage thermostat through an indoor unit control device mounted in the 1-stage indoor unit; an operation state determination and control part for recognizing the signal from the signal input part and the operation state of the compressor or the outdoor fan to change the operation stage of the compressor and the outdoor fan; and a signal output part for outputting a signal to the indoor fan control device based on a signal from the operation state determination and control part.

Preferably, the operation state determination and control part is configured to store or recognize the previous operation state or the current operation state of the compressor or the outdoor fan and to select one of operation stages for the compressor or the outdoor fan, which include high, middle, and low operation stages, according to a control algorithm, based on the previously stored or recognized operation state in the next operation.

Preferably, the indoor fan control device is mounted in the 1-stage indoor unit for controlling the indoor fan according to a signal from an outdoor unit control device mounted in the variable-capacity outdoor unit.

Preferably, the indoor fan control device comprises a relay switch for controlling the operation state of the indoor fan.

Preferably, the indoor fan control device comprises a 2-speed kit having a relay switch for controlling the indoor fan motor to be driven in a high or low operation stage.

In accordance with another aspect of the present invention, there is provided a unitary air conditioner comprising: a 2-stage thermostat for generating one of plural operation signals for the unitary air conditioner or a stop signal for the unitary air conditioner; a 1-stage indoor unit having an indoor fan, the indoor fan being rotated according the operation signal from the 2-stage thermostat; a variable-capacity outdoor unit having a compressor and an outdoor fan, the operation stage of the compressor and the outdoor fan being changed according to the signal from the 2-stage thermostat; and an indoor fan control device for controlling the indoor fan according to the operation stage of the variable-capacity outdoor unit to change the operation state of the indoor fan.

Preferably, the indoor fan is configured to be rotated at least in a high or low operation stage by an indoor fan motor.

Preferably, the 1-stage indoor unit has an indoor unit control device for receiving a signal from the 2-stage thermostat, outputting a control signal to an indoor fan motor, by which the indoor fan is rotated, and transmitting a signal to the variable-capacity outdoor unit.

Preferably, the compressor mounted in the variable-capacity outdoor unit is an inverter type compressor or comprises a plurality of constant-speed compressors.

Preferably, the variable-capacity outdoor unit includes an outdoor unit control device for variably controlling the operation stage of the compressor and the outdoor fan according to the operation state of the variable-capacity outdoor unit.

Preferably, the outdoor unit control device comprises: a signal input part for receiving the signal from the 2-stage thermostat through an indoor unit control device mounted in the 1-stage indoor unit; an operation state determination and control part for recognizing the signal from the signal input part and the operation state of the compressor or the outdoor fan to change the operation stage of the compressor and the outdoor fan; and a signal output part for outputting a signal to the indoor fan control device based on a signal from the operation state determination and control part.

Preferably, the operation state determination and control part is configured to store or recognize the previous operation state or the current operation state of the compressor or the outdoor fan and to select one of operation stages for the compressor or the outdoor fan, which include high, middle, and low operation stages, according to a control algorithm, based on the previously stored or recognized operation state in the next operation.

Preferably, the indoor fan control device is mounted in the 1-stage indoor unit for controlling the indoor fan according to a signal from an outdoor unit control device mounted in the variable-capacity outdoor unit.

Preferably, the indoor fan control device comprises a relay switch for controlling the operation state of the indoor fan.

Preferably, one of the operation signals is directly transmitted to an outdoor unit control device mounted in the variable-capacity outdoor unit from the 2-stage thermostat not through the 1-stage indoor unit.

According to the present invention, the unitary air conditioner is constructed such that the 1-stage indoor unit is connected to the variable-capacity outdoor unit or the 2-stage thermostat. In other words, the 1-stage indoor unit is operated along with another unit having different stages. Also, variable control is accomplished, although the 1-stage indoor unit is used, so long as the indoor fan control device is added to the unitary air conditioner. Consequently, the present invention has the effect of accomplishing a more efficient air conditioning system.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

It should be understood that unitary air conditioners according to numerous preferred embodiments of the present invention may be proposed, although only two most preferred embodiments of the present invention will be described hereinafter.

Figure 1:
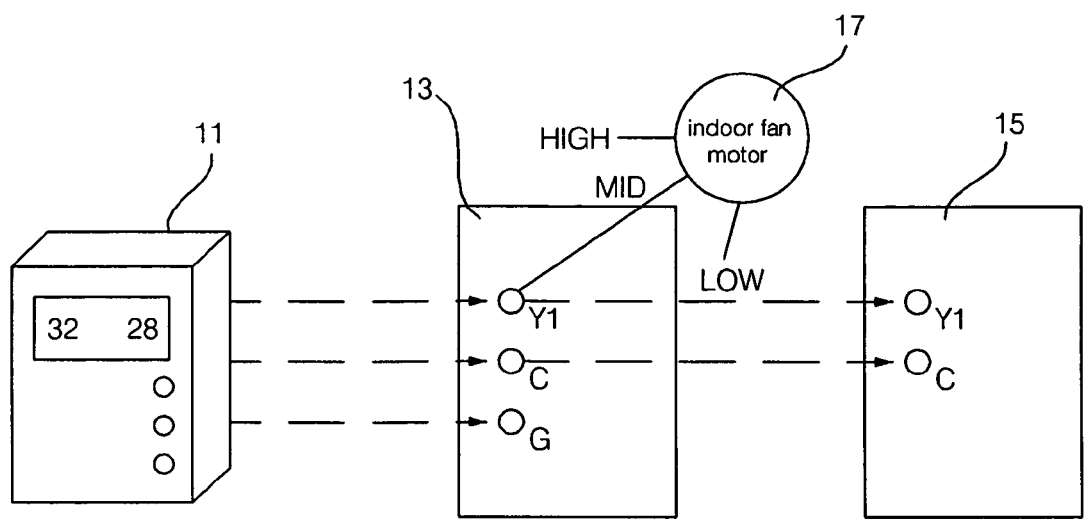
FIG. 1 is a control circuit block diagram showing a conventional 1-stage unitary air conditioner.
Figure 2:
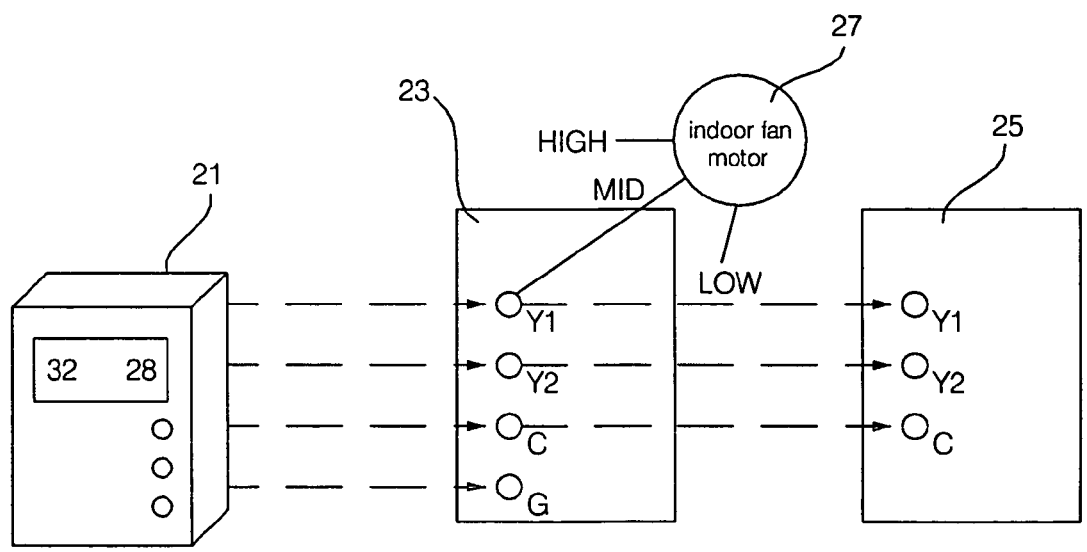
FIG. 2 is a control circuit block diagram showing a conventional 2-stage unitary air conditioner.
Figure 3:
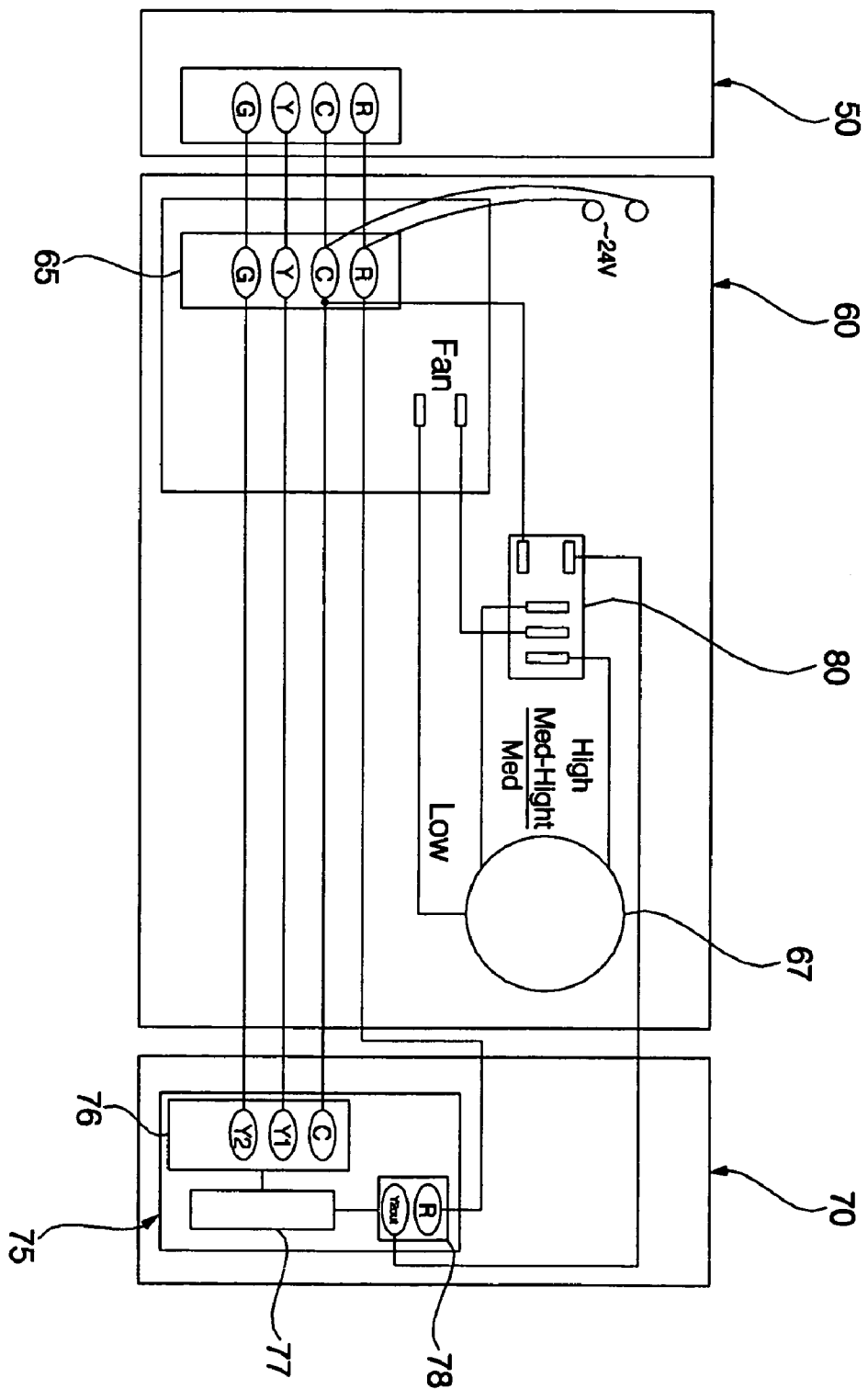
FIG. 3 is a control circuit block diagram showing a unitary air conditioner according to a first preferred embodiment of the present invention.

FIG. 3 is a control circuit block diagram showing a unitary air conditioner according to a first preferred embodiment of the present invention.

As shown in FIG. 3, the unitary air conditioner according to the first preferred embodiment of the present invention comprises: a 1-stage thermostat 50 mounted in a room; a 1-stage indoor unit 60 configured to operate based on a signal from the 1-stage thermostat 50; and a variable-capacity outdoor unit 70 connected to the 1-stage thermostat 50 and the 1-stage indoor unit 60.

The 1-stage thermostat 50 is configured to generate only an operation signal Y for the unitary air conditioner or a stop signal for the unitary air conditioner, i.e., an ON/OFF signal.

The 1-stage indoor unit 60 is configured in 1-stage fashion. Specifically, the 1-stage indoor unit 60 is operated based on only a signal from the 1-stage thermostat 50. In the 1-stage indoor unit 60 is mounted an indoor fan, which is rotated, at least in a high or low operation stage, by an indoor fan motor 67.

In the 1-stage indoor unit 60 is also mounted an indoor unit control device 65. The indoor unit control device 65 receives a signal from the 1-stage thermostat 50, and outputs a control signal to the indoor fan motor 67. In addition, the indoor unit control device 65 transmits a signal to the variable-capacity outdoor unit 70.

In the 1-stage indoor unit 60 is further mounted an indoor fan control device 80 for controlling the indoor fan to be rotated in various different stages according to the operation stage of the variable-capacity outdoor unit 70. The indoor fan control device 80 may comprise a 2-speed kit having a relay switch for controlling the indoor fan motor 67 to be driven in a high or low operation stage.

The relay switch serves to selectively connect a high operation circuit (High) or a low operation circuit (Low) to the motor drive circuit.

Preferably, the indoor fan control device 80 is configured separately from the indoor unit control device 65, and therefore, the indoor fan control device 80 is connected to the motor drive circuit, which drives the indoor fan motor 67, when the variable-capacity outdoor unit 70 is connected to a unit having different stages.

Consequently, the indoor fan control device 80 controls the relay switch to be operated according to the signal from the variable-capacity outdoor unit 70, and controls the indoor fan motor 67 to be driven in the high or low operation stage.

The variable-capacity outdoor unit 70 is turned ON/OFF according to the signal from the 1-stage thermostat 50. The variable-capacity outdoor unit 70 is configured to variably control the capacity and the operation state of a compressor or an outdoor fan based on the determination of an outdoor unit control device 75 while the unitary air conditioner is operated.

The outdoor unit control device 75 comprises: a signal input part 76 for receiving a signal from the 1-stage thermostat 50 through the indoor unit control device 65; an operation state determination and control part 77 for recognizing the signal from the signal input part 76 and the operation state of the compressor or the outdoor fan to change the operation stage of the compressor and the outdoor fan; and a signal output part 78 for outputting a signal to the indoor fan control device 80 based on the signal from the operation state determination and control part 77.

The operation state determination and control part 77 is configured to store or recognize the previous operation state or the current operation state of the compressor or the outdoor fan and to select one of operation stages for the compressor or the outdoor fan, which include high, middle, and low operation stages, according to a control algorithm, based on the previously stored or recognized operation state in the next operation.

When the compressor is operated for a predetermined period of time in the low operation state, for example, the operation state determination and control part 77 changes the operation state of the compressor to the middle or high operation state. When the previous operation state of the compressor is the high operation state, on the other hand, the operation state determination and control part 77 changes the operation state of the compressor to the high operation state irrespective of the signal from the 1-stage thermostat.

The compressor mounted in the variable-capacity outdoor unit 70 may be an inverter type compressor or may comprise a plurality of constant-speed compressors. Preferably, the compressor is configured such that the compressor is operated in two stages or three stages, such as high, middle, and low stages, according to the control of the operation state determination and control part 77.

Now, the operation of the unitary air conditioner with the above-stated construction according to the first preferred embodiment of the present invention will be described.

When a unitary-capacity operation signal Y is inputted to the 1-stage indoor unit 60 and the variable-capacity outdoor unit 70 from the 1-stage thermostat 50, the indoor fan motor 67 is driven in a low operation stage. Also, the compressor of the variable-capacity outdoor unit 70 and the outdoor fan motor are driven in the low operation stage.

At this time, the outdoor unit control device 75 of the variable-capacity outdoor unit 70 determines the previous or current operation state of the compressor. When the operation stage is changed into a high operation stage as a result of the determination of the outdoor unit control device 75, the operation stage of the compressor and the operation stage of the outdoor fan motor are changed into the high operation stage according to the control of the operation state determination and control part 77. Also, a signal is outputted to the indoor fan control device 80 of the 1-stage indoor unit 60 through the signal output part 78.

At this time, the relay switch of the indoor fan control device 80 changes the circuit such that the indoor fan motor 67 is driven in the high operation stage, and therefore, the indoor fan is rotated in the high operation stage when the variable-capacity outdoor unit 70 is operated.

When the operation stage is to be changed into a weak operation stage or another operation stage by the outdoor unit control device 75, a signal is outputted to the indoor fan control device 80 through the signal output part 78. As a result, the operation stage of the indoor fan motor 67 is changed.

According to the unitary air conditioner according to the first preferred embodiment of the present invention as described above, the 1-stage indoor unit 60 is variably controlled when the variable-capacity outdoor unit 70 is operated.

Figure 4:
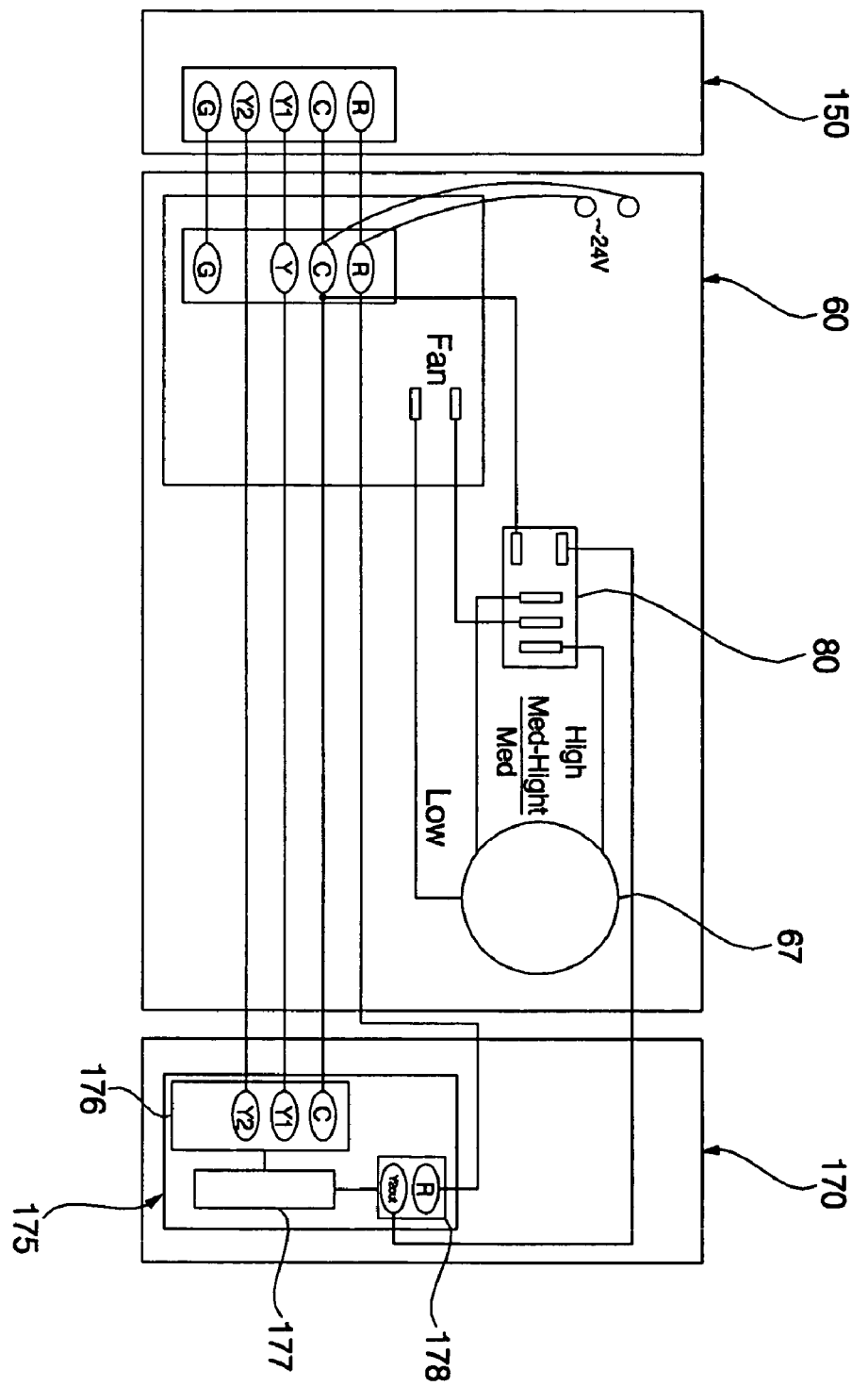
FIG. 4 is a control circuit block diagram showing a unitary air conditioner according to a second preferred embodiment of the present invention.

FIG. 4 is a control circuit block diagram showing a unitary air conditioner according to a second preferred embodiment of the present invention.

The unitary air conditioner according to the second preferred embodiment of the present invention is similar in construction to the unitary air conditioner according to the first preferred embodiment of the present invention except that the unitary air conditioner according to the second preferred embodiment of the present invention uses a 2-stage thermostat 150 instead of the 1-stage thermostat 50.

When a low operation signal Y1 is generated from the 2-stage thermostat 150 of the unitary air conditioner according to the second preferred embodiment of the present invention, a 1-stage indoor unit 60 and a variable-capacity outdoor unit 170 are operated in the same fashion as the unitary air conditioner according to the first preferred embodiment of the present invention.

When a high operation signal Y2 is generated from the 2-stage thermostat 150, on the other hand, the signal is inputted to a signal input part 176 of the variable-capacity outdoor unit 170 while the signal does not directly affect the control of the 1-stage indoor unit 60. The inputted signal is directly transmitted to a signal output part 178 or transmitted to the signal output part 178 through an indoor fan control device 80, and is then transmitted to an indoor fan control device 80. Alternatively, the low operation signal Y1, instead of the high operation signal Y2, may be directly inputted to the signal input part 176 of the variable-capacity outdoor unit 170 from the 2-stage thermostat 150.

Consequently, the indoor fan control device 80 variably controls the indoor fan motor 67 according to the signal from the outdoor unit control device 175. Specifically, the indoor fan control device 80 controls the indoor fan motor 67 in the high or low operation stage according to the signal from the outdoor unit control device 175. In addition, the signal from the 2-stage thermostat 150 is transmitted to the indoor fan control device 80 from the outdoor unit control device 175, and therefore, the operation stage can be changed into the high or low operation stage.

As apparent from the above description, the unitary air conditioner according to the present invention is constructed such that the 1-stage indoor unit is connected to the variable-capacity outdoor unit or the 2-stage thermostat. In other words, the 1-stage indoor unit is operated along with another unit having different stages. Also, variable control is accomplished, although the 1-stage indoor unit is used, so long as the indoor fan control device is added to the unitary air conditioner. Consequently, the present invention has the effect of accomplishing a more efficient air conditioning system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A unitary air conditioner, comprising:
    a 1-stage thermostat which generates an operation signal to operate the unitary air conditioner or a stop signal to stop the unitary air conditioner;
    a 1-stage indoor unit having an indoor fan, the indoor fan being rotated according to the operation signal generated by the 1-stage thermostat;
    a variable-capacity outdoor unit configured to be operated according to the 1-stage thermostat, the variable-capacity outdoor unit having a compressor and an outdoor fan, an operation stage of the compressor and the outdoor fan being changed according to an operation state of the variable-capacity outdoor unit; and
    an indoor fan control device configured to control the indoor fan according to the operation stage of the compressor of the variable-capacity outdoor unit to change an operation state of the indoor fan, the indoor fan control device being provided in the 1-stage indoor unit to control the indoor fan according to a signal generated by an outdoor unit control device provided in the variable capacity outdoor unit.

2. The air conditioner as set forth in claim 1, wherein the indoor fan is configured to be rotated at least in a high or low operation stage by an indoor fan motor.

3. The air conditioner as set forth in claim 1, wherein the 1-stage indoor unit has an indoor unit control device configured to receive a signal from the 1-stage thermostat, output a control signal to an indoor fan motor which rotates the indoor fan, and transmit a signal to the variable-capacity outdoor unit.

4. The air conditioner as set forth in claim 1, wherein the compressor of the variable-capacity outdoor unit comprise one of an inverter type compressor or a plurality of constant-speed compressors.

5. The air conditioner as set forth in claim 1, wherein the outdoor unit control device is configured to variably control the operation stage of the compressor and the outdoor fan according to the operation state of the variable-capacity outdoor unit.

6. The air conditioner as set forth in claim 5, wherein the outdoor unit control device comprises:
    a signal input part which receives the signal from the 1-stage thermostat through an indoor unit control device provided in the 1-stage indoor unit;
    an operation state determination and control part which recognizes a signal from the signal input part and the operation state of the compressor or the outdoor fan so as to change the operation stage of the compressor and the outdoor fan; and
    a signal output part which outputs a signal to the indoor fan control device based on a signal from the operation state determination and control part.

7. The air conditioner as set forth in claim 6, wherein the operation state determination and control part is configured to store or recognize the previous operation state or the current operation state of the compressor or the outdoor fan and to select one of operation stages for the compressor or the outdoor fan, which include high, middle, and low operation stages, according to a control algorithm, based on the previously stored or recognized operation state in the next operation.

8. The air conditioner as set forth in claim 1, wherein the indoor fan control device comprises a relay switch configured to control the operation state of the indoor fan.

9. The air conditioner as set forth in claim 1, wherein the indoor fan control device comprises a 2-speed kit having a relay switch, the relay switch being configured to control the indoor fan motor to be driven in a high or low operation stage.

10. A unitary air conditioner comprising:
    a 2-stage thermostat which generates one of plural operation signals to operate the unitary air conditioner or a stop signal to stop the unitary air conditioner;
    a 1-stage indoor unit having an indoor fan, the indoor fan being rotated according to an operation signal generated the 2-stage thermostat;
    a variable-capacity outdoor unit having a compressor and an outdoor fan, an operation stage of the compressor and the outdoor fan being changed according to the signal generated by the 2-stage thermostat; and
    an indoor fan control device configured to control the indoor fan according to the operation stage of the variable-capacity outdoor unit to change an operation state of the indoor fan, the indoor fan control device being provided in the 1-stage indoor unit to control the indoor fan according to a signal generated by an outdoor unit control device provided in the variable capacity outdoor unit.

11. The air conditioner as set forth in claim 10, wherein the indoor fan is configured to be rotated at least in a high or low operation stage by an indoor fan motor.

12. The air conditioner as set forth in claim 10, wherein the 1-stage indoor unit has an indoor unit control device configured to receive a signal from the 2-stage thermostat, output a control signal to an indoor fan motor which rotates the indoor fan is rotated, and transmit a signal to the variable-capacity outdoor unit.

13. The air conditioner as set forth in claim 10, wherein the compressor of the variable-capacity outdoor unit comprises one of an inverter type compressor or a plurality of constant-speed compressors.

14. The air conditioner as set forth in claim 10, wherein the outdoor unit control device is configured to control the operation stage of the compressor and the outdoor fan according to the operation state of the variable-capacity outdoor unit.

15. The air conditioner as set forth in claim 14, wherein the outdoor unit control device comprises:
    a signal input part which receives the signal from the 2-stage thermostat through an indoor unit control device mounted in the 1-stage indoor unit;
    an operation state determination and control part which recognizes the signal from the signal input part and the operation state of the compressor or the outdoor fan so as to change the operation stage of the compressor and the outdoor fan; and
    a signal output part which outputs a signal to the indoor fan control device based on a signal from the operation state determination and control part.

16. The air conditioner as set forth in claim 15, wherein the operation state determination and control part is configured to store or recognize the previous operation state or the current operation state of the compressor or the outdoor fan and to select one of operation stages for the compressor or the outdoor fan, which include high, middle, and low operation stages, according to a control algorithm, based on the previously stored or recognized operation state in the next operation.

17. The air conditioner as set forth in claim 10, wherein the indoor fan control device comprises a relay switch configured to control the operation state of the indoor fan.

18. The air conditioner as set forth in claim 10, wherein one of the plural operation signals is directly transmitted to the outdoor unit control device from the 2-stage thermostat, and not through the 1-stage indoor unit.

* * * * *

UNITED STATES PATENT AND TRADEMARK OFFICE
CERTIFICATE OF CORRECTION

PATENT NO. : 7,513,124 B2  
APPLICATION NO. : 11/319472  
DATED : April 7, 2009  
INVENTOR(S) : Won Hee Lee et al.

Page 1 of 1

It is certified that error appears in the above-identified patent and that said Letters Patent is hereby corrected as shown below:

At column 7, line 33 of the printed patent, "comprise" should read -- comprises --.

At column 8, line 34 of the printed patent, -- variably -- should be inserted before control.

Signed and Sealed this

Twenty-sixth Day of May, 2009

JOHN DOLL  
*Acting Director of the United States Patent and Trademark Office*